US010123172B2

(12) United States Patent
Deluca et al.

(10) Patent No.: US 10,123,172 B2
(45) Date of Patent: Nov. 6, 2018

(54) CUSTOMER TOUCHPOINT PATTERNS AND ASSOCIATED SENTIMENT ANALYSIS

(71) Applicant: INTERNATIONAL BUSINESS MACHINES CORPORATION, Armonk, NY (US)

(72) Inventors: Lisa Seacat Deluca, Baltimore, MD (US); Dana L. Price, Surf City, NC (US); Shelbee D. Smith-Eigenbrode, Thornton, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/399,264

(22) Filed: Jan. 5, 2017

(65) Prior Publication Data
US 2018/0192244 A1 Jul. 5, 2018

(51) Int. Cl.
*H04W 24/00* (2009.01)
*H04W 4/02* (2018.01)
(Continued)

(52) U.S. Cl.
CPC .......... *H04W 4/023* (2013.01); *H04L 67/18* (2013.01); *H04L 67/22* (2013.01); *H04L 67/26* (2013.01); *H04W 88/02* (2013.01)

(58) Field of Classification Search
CPC ........ H04W 4/025; G01C 21/20; H04L 67/22; H04L 67/20; H04L 67/306; G06Q 50/01; G06Q 30/0267
See application file for complete search history.

(56) References Cited

U.S. PATENT DOCUMENTS

2013/0073336 A1 3/2013 Heath
2014/0279034 A1* 9/2014 Samuel ................... H04L 67/22
705/14.64
(Continued)

FOREIGN PATENT DOCUMENTS

WO 2014207646 12/2014

OTHER PUBLICATIONS

Choi et al., "Using Heart Rate Monitors to Detect Mental Stress", Body Sensor Networks, IEE Computer Society, 2009, 5 pages.
Disclosed Anonymously et al., "Method and System for Recommending a Product Shelf Based on a Purchase History of a User", IP.com, http://ip.com/IPCOM/000238808D, Sep. 18, 2014, 3 pages.
Disclosed Anonymously et al., "Cognitive Personal Shopping Assistant Optimized on Shopper's Profile", IP.com, http://ip.com/IPCOM/000241828D, Jun. 2, 2015, 6 pages.
(Continued)

*Primary Examiner* — Idowu O Osifade
(74) *Attorney, Agent, or Firm* — Issac Gooshaw; Andrew D. Wright; Roberts Mlotkowski Safran Cole & Calderon, P.C.

(57) ABSTRACT

Systems and methods for customer touchpoint pattern and sentiment analysis are disclosed. In embodiments, a computer-implemented method comprises: detecting, by a computer device, the presence of a mobile device of a participant within a venue during a first event; monitoring, by the computing device, the location of the mobile device of the participant within the venue during the first event; detecting, by the computing device, at least one interaction event between the participant and a venue associate; recording, by the computing device, first event data including interaction event data; detecting, by the computing device, the presence of the mobile device of the participant within the venue during a second event; determining, by the computing device, one or more customer service parameters based on the first event data; and generating, by the computing device, an alert based on the one or more customer service parameters.

20 Claims, 7 Drawing Sheets

(51) Int. Cl.
*H04L 29/08* (2006.01)
*H04W 88/02* (2009.01)

(56) References Cited

U.S. PATENT DOCUMENTS

| | | |
|---|---|---|
| 2015/0025936 A1 | 1/2015 | Garel et al. |
| 2015/0032503 A1 | 1/2015 | Chandler et al. |
| 2015/0045068 A1* | 2/2015 | Soffer .................. H04W 4/025 455/456.3 |
| 2015/0088598 A1 | 3/2015 | Acharyya et al. |
| 2016/0148218 A1* | 5/2016 | Koch ................. G06Q 30/0201 705/7.29 |
| 2017/0352069 A1 | 12/2017 | Deluca et al. |

OTHER PUBLICATIONS

Disclosed Anonymously et al.,"System for Intelligent Customer Notification of Discounted Returned Merchandise", IP.com, http://ip.com/IPCOM/000243614D, Oct. 5, 2015, 3 pages.

"Real-Time Processing of In-Store Data", Walkbase Technology, http://www.walkbase.com/real-time-processing-of-in-store-data, Accessed Oct. 30, 2016, 6 pages.

"Analytics", IBM Social Sentiment Analysis Powered by IBM Analytics—India, http://www.ibm.com/analytics/in/en/conversations/social-sentiment.html, Accessed Nov. 29, 2016, 2 pages.

"Engage Mobile Users in New Ways with IBM Presence Insights", Presence Insights, presenceinsights.ng.bluemix.net/piui/, Accessed Jan. 5, 2017, 2 pages.

* cited by examiner

CUSTOMER TOUCHPOINT PATTERNS AND ASSOCIATED SENTIMENT ANALYSIS

BACKGROUND

The present invention relates generally to customer behavior analysis, and, more particularly, to systems and methods for customer touchpoint pattern and sentiment analysis.

Sales associates that help shoppers at stores can have a significant impact on the experience shoppers have, either positive or negative. Various methods are known for tracking movement of a customer (e.g., via a customer's mobile device) through a venue. However, there is presently no way to track the interaction of customers and sales associates as a customer moves through a venue in a way that provides information regarding successful interactions between the customers and sales associates (e.g., interactions that result in a purchase by the customer). Moreover, there is presently no way to automatically initiate interactions between selected sales associates and particular customers.

SUMMARY

In an aspect of the invention, a computer-implemented method for customer touchpoint pattern and sentiment analysis comprises: detecting, by a computer device, the presence of a mobile device of a participant within a venue during a first event; monitoring, by the computing device, the location of the mobile device of the participant within the venue during the first event; detecting, by the computing device, at least one interaction event between the participant and a venue associate; recording, by the computing device, first event data including interaction event data; detecting, by the computing device, the presence of the mobile device of the participant within the venue during a second event; determining, by the computing device, one or more customer service parameters based on the first event data; and generating, by the computing device, an alert based on the one or more customer service parameters.

In another aspect of the invention, there is a computer program product for customer touchpoint pattern and sentiment analysis. The computer program product comprises a computer readable storage medium having program instructions embodied therewith. The program instructions are executable by a computing device to cause the computing device to: detect the presence of a mobile device of a participant within a venue during a first event; monitor the location of the mobile device of the participant within the venue during the first event; detect at least one interaction event between the participant and a venue associate; record first event data, including interaction event data, in a touchpoint database; detect the presence of the mobile device of the participant within the venue during a second event; determine sentiment data indicative of sentiment of the participant with respect to the venue associate based on data stored in the touchpoint database, including the first event data; and generate an alert based on the sentiment data.

In another aspect of the invention, there is a system for customer touchpoint pattern and sentiment analysis. The system includes a CPU, a computer readable memory and a computer readable storage medium associated with a computing device. The system also includes: program instructions to detect the presence of a mobile device of a participant within a venue during a first event; program instructions to monitor the location of the mobile device of the participant within the venue during the first event; program instructions to detect at least one interaction event between the participant and a venue associate; program instructions to record first event data including interaction event data; program instructions to detect the presence of the mobile device of the participant within the venue during a second event; program instructions to determine one or more customer service parameters based on the first event data, the customer parameters including a sentiment value indicative of the sentiment of the participant with respect to the venue associate; and program instructions to generate an alert based on the one or more customer service parameters, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
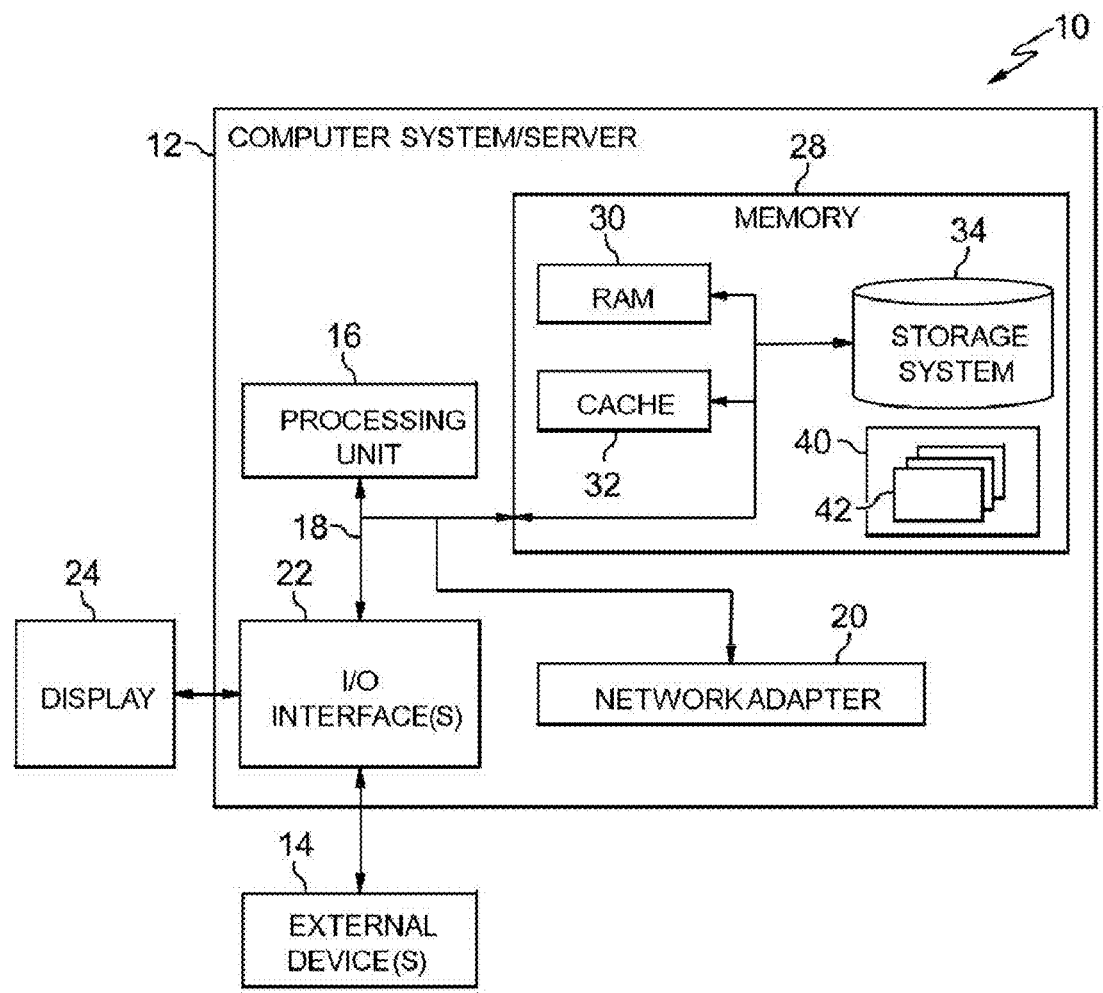
FIG. 1 depicts a computing infrastructure according to an embodiment of the present invention.

The present invention relates generally to customer behavior analysis, and, more particularly, to systems and methods for customer touchpoint pattern and sentiment analysis. In aspects, a participant tracking or monitoring system is set up in a venue (e.g., a department store, a supermarket, etc.). A participant downloads a mobile application to their mobile device to enable the monitoring system to recognize the participant's mobile device and record information about the participant's journey through the venue during an event (e.g., any given shopping trip). As the participant moves through the venue, the participant's movements are monitored using techniques such as global positioning system (GPS) technology, or Bluetooth beacon technology. Monitoring data may include data regarding zones entered and exited by the participant, the participant's duration or dwell time within a zone, data and time information, the speed of a participant's progress through the venue, and other data. One or more venue associates (e.g., customer service associates) also have mobile devices which are monitored by the monitoring system as the one or more venue associates travel through the venue.

In aspects, the monitoring system determines when a participant's device is within a predetermined proximity to an associate's device. In aspects, the system determines when the participant's device is within a predetermined proximity to the associate's device for a predetermined period of time (e.g., within 6 feet for over 1 minute). The monitoring system records monitoring data in a touchpoint database for analysis, along with additional data regarding interactions between the participant and the one or more venue associates. When the participant returns to the venue during a subsequent event (e.g., subsequent shopping trip), the monitoring data recorded during the first event is utilized to determine which, if any, of the one or more venue associates would be the best associate to assist the returning participant. In embodiments, alerts are sent to one or more venue associates to instruct the one or more associates to interact or avoid interaction with the returning participant. Additional details of the present invention are discussed below.

Advantageously, the system of the present invention may reduce computing overhead (i.e., consumption of computing resources) by leveraging resources of conventional customer monitoring systems in a touchpoint system of the present invention. For example, the present invention leverages monitoring devices and associated computing resources to track interactions between participants (e.g., customers) and venue associates (e.g., customer service associate), thus increasing the use of the monitoring information without requiring additional resources. Moreover, the system of the present invention is an improvement over conventional customer monitoring systems in that it provides the novel functionality of participant/associate interaction analysis and associate alerts/notifications.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
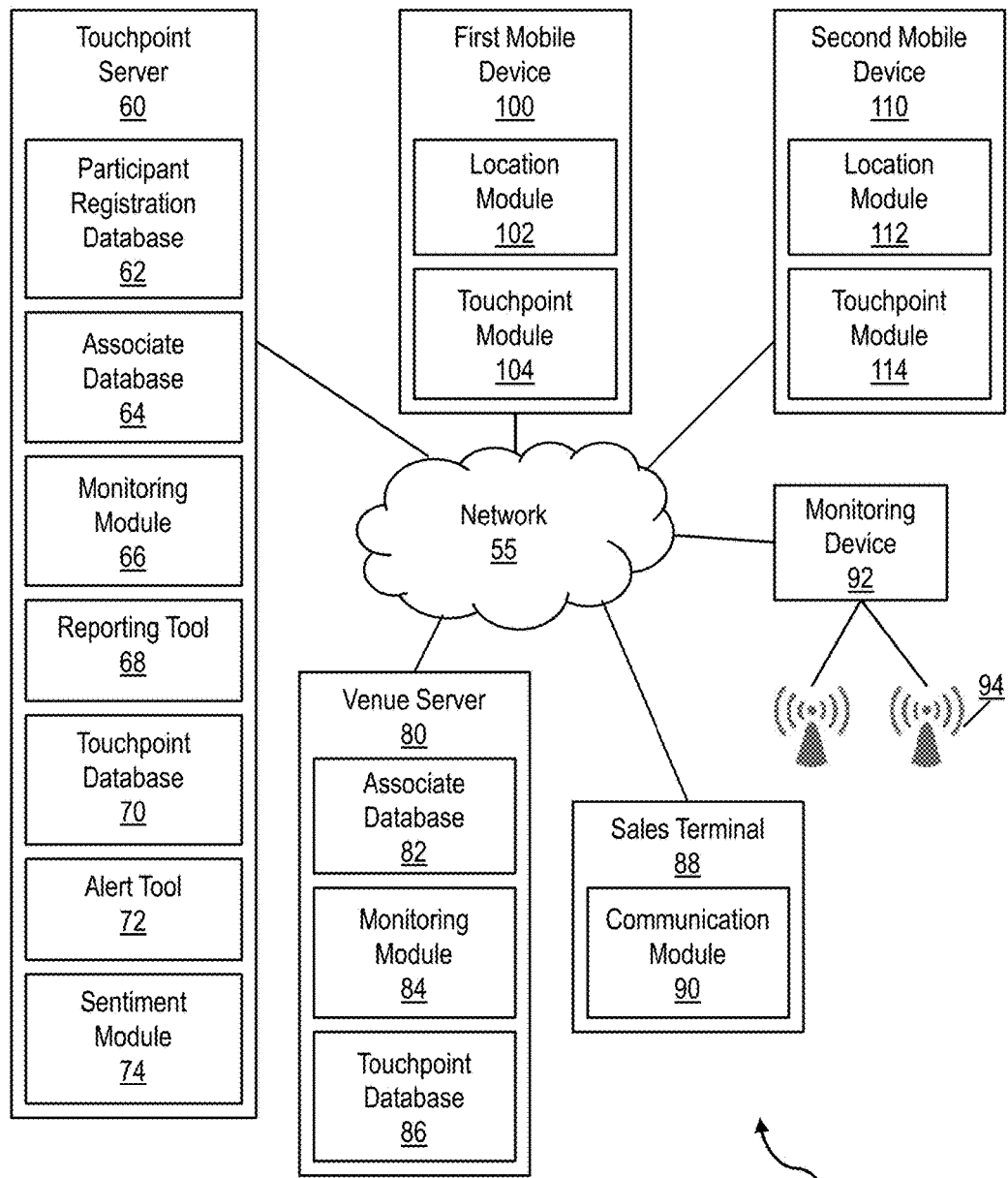
FIG. 2 shows an exemplary environment in accordance with aspects of the invention.

FIG. 2 shows an exemplary touchpoint system 50 in accordance with aspects of the invention. The environment includes a touchpoint server 60 connected to a network 55. The touchpoint server 60 may comprise a computer system 12 of FIG. 1, and may be connected to the network 55 via the network adapter 20 of FIG. 1. The touchpoint server 60 may be configured as a special purpose computing device that enables enhanced customer service management. For example, the touchpoint server 60 may be part of a customer service management system for a venue (e.g., department store), or may provide customer service management assistance to a remote venue server 80 (e.g., a department store server) through the network 55. In embodiments, the touchpoint server 60 is in communication with a monitoring device 92 of a venue. In aspects, the touchpoint server 60 is in communication with at least one mobile device of a participant (e.g., first mobile device 100), and at least one mobile device of an associate (e.g., second mobile device 110). In aspects, the touchpoint server 60 is in communication with at least one sales terminal 88 of a venue.

The network 55 may be any suitable communication network or combination of networks, such as a local area network (LAN), a general wide area network (WAN), and/or a public network (e.g., the Internet). The first mobile device 100 and the second mobile device 110 may be any type of mobile devices capable of providing location information of the device to one of a monitoring device 92, the venue server 80 or the touchpoint server 60. By way of example, the first mobile device 100 and the second mobile device 110 can be RFID tags, smartphones, tablets, or Bluetooth enabled tracking devices. In embodiments, the first mobile device 100 and the second mobile device 110 are GPS or Bluetooth enabled smartphones. In embodiments, the monitoring device 92 is a Bluetooth monitoring device in communication with Bluetooth beacons indicated at 94, which may be positioned throughout a venue to gather location information from Bluetooth enabled mobile devices (e.g., 100, 110). In aspects, the monitoring device 92 receives location information of the first mobile device and/or the second mobile device 110 from the Bluetooth beacons 94, and communicates the location information to a monitoring module 66 of the touchpoint server 60, or a monitoring module 84 of the venue server 80.

With continued reference to FIG. 2, in embodiments, the touchpoint server 60 includes a participant registration database 62 for storing data related to participants (e.g., venue customers), an associate database 64 for storing data related to venue associates (e.g., sales associates at the venue), the monitoring module 66, a reporting tool 68, a touchpoint database 70 for storing touchpoint data (e.g., any data related to contact or interactions between a participant and an associate), and an alert tool 72 for providing reports, alerts or notifications to associates or venue managers. In aspects, the touchpoint server 60 also includes a sentiment module 74 for analyzing data and providing sentiment analysis of the data.

The monitoring module 66 of the touchpoint server 60 may include one or more program modules (e.g., program module 42 of FIG. 1) executed by the touchpoint server 60. In aspects, the monitoring module 66 is configured to collect and analyze participant and associate tracking or monitoring data. In aspects, the monitoring module 66 collects participant and association tracking or monitoring data from the monitoring device 92. Similarly, the monitoring module 84 of the venue server 80 may include one or more program modules (e.g., program module 42 of FIG. 1) executed by the venue server 80. In aspects, the monitoring module 84 is configured to collect and analyze participant and associate tracking or monitoring data. In aspects, the monitoring module 84 collects participant and association tracking or monitoring data from the monitoring device 92.

In aspects the sentiment module 74 may include one or more program modules (e.g., program module 42 of FIG. 1) executed by the touchpoint server 60. While depicted as part of touchpoint server 60, it should be understood that a remote sentiment module (not shown) in communication with the touchpoint server 60 through network 55 could also be utilized in accordance with aspects of the present invention. The reporting tool 68 may also include one or more program modules (e.g., program module 42 of FIG. 1) executed by the touchpoint server 60. In aspects, the reporting tool 68 is configured to generate reports based on data collected in the touchpoint database 70 and display the reports to users, such as through a display (e.g., display 24 of FIG. 1) of the touchpoint server 60.

Still referencing FIG. 2, in embodiments, each of the first and second mobile devices 100, 110 include a location module 102, 112 and a touchpoint module 104, 114. The location module 102, 112 may include one or more program modules (e.g., program module 42 of FIG. 1) executed by the respective first and second mobile devices 100, 110. In aspects, the location modules 102, 112 are configured to gather location information of the respective device 100, 110 using GPS technology. In embodiments, the location modules 102, 112 comprise Bluetooth technology that communicates location information of the respective device 100, 110 to the monitoring device 92, the monitoring module 66 of the touchpoint server 60, or the monitoring module 84 of the venue server 80.

The touchpoint modules 104, 114 are configured to perform one or more of the functions described herein. The touchpoint modules 104, 114 may include one or more program modules (e.g., program module 42 of FIG. 1) executed by the respective first and second mobile devices 100, 110. In embodiments, the touchpoint modules 104, 114 are configured to provide user information to at least one of the touchpoint server 60 and venue server 80. The user information may include user identification information, device location information, user feedback information (e.g., customer satisfaction survey information, associate survey information, etc.), or other types of user information.

Still referring to FIG. 2, the venue server 80 may be a general purpose computing device, such as a desktop computer, laptop computer, tablet computer, smartphone, etc. In embodiments, the venue server 80 includes an associate database 82 for storing information regarding venue associates (e.g., sales associates at a venue), a monitoring module for gathering and analyzing location information from the first and second mobile devices 100, 110, and a touchpoint database 86 for gathering and storing touchpoint data (e.g., any data related to contact or interactions between a participant and an associate). The venue server 80 may be in communication with the at least one sales terminal 88 at a venue. In aspects, the at least one sales terminal 88 includes a communication module 90 for communicating sales information to at least one of the touchpoint server 60 and the venue server 80.

Figure 3:
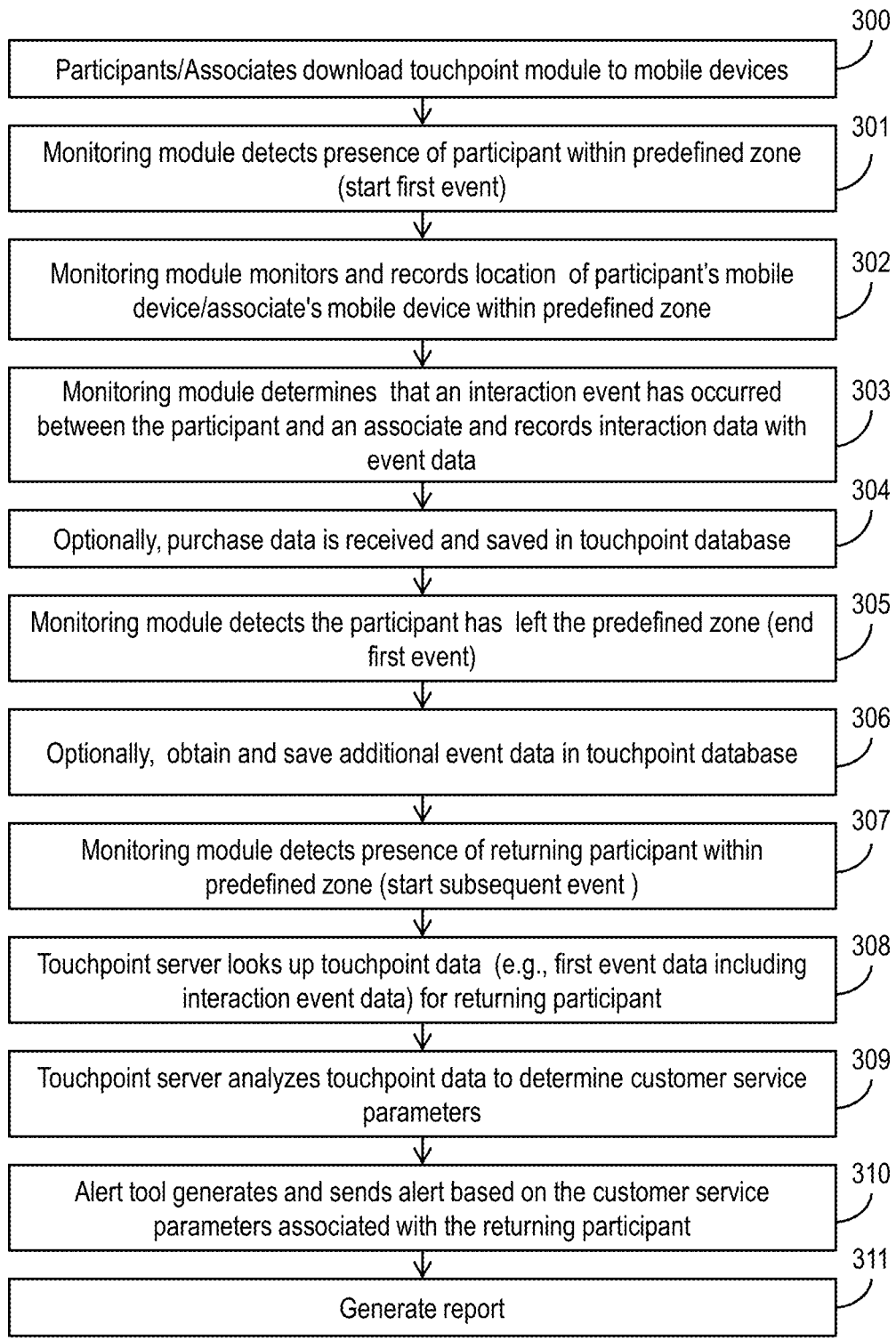
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

In embodiments, at step 300, participants (e.g., customers) and associates (e.g., customer sales associates at a venue) download a touchpoint module (e.g. 104, 114) to their respective mobile devices (e.g., 100, 110). In embodiments, the participant's smartphone (e.g., 100) downloads the touchpoint module 104 as a mobile application from the touchpoint server 60 via the network 55. In embodiments, the participant registers with the touchpoint server 60, and participant information is entered into the participant registrations database 62. In embodiments, the associates register associate information in the associate database 64 of the touchpoint server. Conventional registrations methods can be utilized in accordance with embodiments of the present invention. By way of example, participant information may include a participant's email address, telephone number and mobile device information. The associate information may include mobile device and associate information (e.g., device ID, name of sales associate, etc.).

At step 301, the monitoring module 66 of the touchpoint server 60 detects the presence of a participant within a predefined zone, which indicates the start of an initial or first event (e.g., first shopping event). The predefined zone can be any zone defined by the touchpoint system 50. In embodiments, the monitoring module 66 of the touchpoint server 60 recognizes when the participant's mobile device (e.g., the first mobile device 100) enters a predefined zone (e.g., enters a shopping venue). It should be understood that the step of detecting the presence of a participant's mobile device (e.g., first mobile device 100) may be accomplished in a number of ways utilizing various components of the touchpoint system 50. In embodiments, the first mobile device 100 is a Bluetooth enabled smartphone that is recognized by Bluetooth beacons 94 of a venue's monitoring device 92. In this embodiment, the monitoring device 92 communicates location information gathered by the Bluetooth beacons 94 to the touchpoint server 60. In embodiments, the touchpoint server 60 may obtain location information from the monitoring module 84 of the venue server 80, which may in turn obtain the location information from the monitoring device 92. In embodiments, the touchpoint module 104 of the first mobile device 100 may communicate GPS location information obtained from the location module 102 to the monitoring module 66 of the touchpoint server 60. It should be understood that various mobile device locating technologies may be utilized in conjunction with embodiments of the present invention, and the methods described herein are not intended to be limited to the exemplary scenarios described.

In step 302, the monitoring module 66 of the touchpoint server monitors and records the location of the participant's mobile device (e.g., 100) within the predefined zone (e.g., shopping venue) as the participant moves throughout the predefined zone. In embodiments, the monitoring module 66 also monitors and records the location of the associate's mobile device (e.g., 110) within the predefined zone. In embodiments, location data from the monitoring module 66 is recorded in the touchpoint database 70. Movements of the participant and/or associate mobile device (e.g., 100, 110) through the predefined zone (e.g., venue) can be tracked using Bluetooth beacons 94. By way of example, monitoring information that may be recorded includes zones entered, zones exited, duration or dwell time in zones, data and time information, speed of the participant/associate, etc.

In step 303, the monitoring module 66 determines that an interaction event has occurred between the participant and the associate, and stores interaction event data in the touchpoint database 70. In embodiments, an interaction event is determined to have occurred when the monitoring module 66 detects that the participant's mobile device (e.g., 100) is within a predetermined threshold distance from the associate's mobile device (e.g., 110). In aspects, the interaction event is determined to have occurred when the monitoring module 66 detects that the participant's mobile device (e.g., 100) is within the predetermined threshold distance (e.g., 6 feet) from the associate's mobile device (e.g., 110) for a predetermined amount of time (e.g., 1 minute). In an alternative embodiment, an interaction event is determined to have occurred when an associate sends a communication indicating an interaction event has occurred. It should be understood that step 303 can be repeated any number of times during the course of an event (e.g., during each shopping event). Accordingly, multiple interaction events may be recorded during each event (e.g., first event).

Optionally, at step 304, purchase transaction information for a purchase made by the participant during the first event (e.g., first shopping event) is recorded in the touchpoint database 70 of the touchpoint server 60. In embodiments, purchase transaction information gathered at a sales terminal 88 during a purchase transaction is communicated to the touchpoint server 60 by the terminal's communication module 90 via the network 50. A purchase transaction can be recognized by the touchpoint system 50 in a number of ways. As an example, a reward card or credit card utilized during a purchase transaction can be recognized by the sales terminal 88 or touchpoint server 60 as belonging to the participant, and the purchase transaction data can be associated and stored with other touchpoint data of the participant in the touchpoint database 70.

At step 305, the monitoring module 66 detects that the participant has left the predefined zone, and records an end to the first event (e.g., end of first shopping event) in the touchpoint database 70. In embodiments, the monitoring module 66 of the touchpoint server 60 recognizes when the participant's mobile device (e.g., the first mobile device 100) exits a predefined zone (e.g., exits a shopping venue). It should be understood that the step of detecting that the participant has left the predefined zone may comprise detecting the absence of the participant's mobile device (e.g., first mobile device 100).

The detection of a participant's mobile device or the detection of the absence of the participant's mobile device may be accomplished in a number of ways utilizing various components of the touchpoint system 50. For example, when the first mobile device 100 is a Bluetooth enabled smartphone, the Bluetooth beacons 94 of a venue's monitoring device 92 may be configured to recognize when the first mobile device 100 exits a predefined zone. In this embodiment, the monitoring device 92 communicates location information gathered by the Bluetooth beacons 94 to the touchpoint server 60. In embodiments, the touchpoint server 60 may obtain location information from the monitoring module 84 of the venue server 80, which may in turn obtain the location information from the monitoring device 92. In embodiments, the touchpoint module 104 of the first mobile device 100 may communicate GPS location information obtained from the location module 102 to the monitoring module 66 of the touchpoint server 66. As previously mentioned, various mobile device locating technologies may be utilized in conjunction with embodiments of the present invention, and the methods described herein are not intended to be limited to the exemplary scenarios described.

Optionally, at step 306, additional event data is obtained by the touchpoint server 60, and saved in the touchpoint database 100. In embodiments, questions regarding an interaction event are communicated to the participant or an associate who interacted with the participant, and answers to the questions are recorded in the touchpoint database 100. In aspects, the data gathered indicates whether the interaction was positive or negative. In aspects, the touchpoint server 60 has access to social media data or public participant data (e.g., participant data from third parties) for the purpose of obtaining additional event data (including interaction data). By way of example, a public post on a social media site may indicate that the participant was provided with excellent customer service by a particular venue associate. In this case, the customer service information may be saved in the touchpoint database 100 as the additional event data. It should be understood that step 306 may occur during the first event or after the first event.

At step 307, the monitoring module 66 detects the presence of a returning participant within the predefined zone during a subsequent visit to the venue or subsequent event. Any of the detection methods discussed above with respect to step 301 can be utilized to detect the presence of a returning participant.

At step 308, the touchpoint server 60 looks up touchpoint data for the participant stored in the touchpoint database 70. In accordance with steps discussed above, the touchpoint data includes first event data (e.g., interaction event data and any additional event data gathered at step 306 for the returning participant). In aspects of the invention, touchpoint data includes one or more of the following: amount of time the participant was speaking with an associate (e.g., sales associate); amount of repeat interactions with the associate during a single event (e.g., first event); mobile device questionnaire data from the participant and/or associate (see FIG. 4); amount of money spent during an event; the number of items purchased during an event; the amount of money spent on items from a zone associated with an associate (e.g., an associate works in the zone "Cosmetics" and is associated with the zone "Cosmetics"); the amount of items purchased from a zone associated with an associate; customer satisfaction survey data (e.g., online or telephone surveys); subsequent company interactions (e.g., associate or participant comments to managers, customer service desk attendants, etc.); and pattern of returns.

At step 309, the touchpoint server 60 analyzes the touchpoint data to determine customer service parameters. As used herein, the term customer service parameter refers to a parameter providing information indicative of positive or negative interaction or event outcomes. The customer service parameters may include sentiment values related to an event (e.g., positive or negative values), participant time spent with each of a plurality of associates, number of purchases made in a particular zone, preferences for particular associates, etc. By way of example, the amount of money spent and/or purchases of items related to a particular zone of a sales associate (e.g., Cosmetics, Womenswear, Men's Shoes, etc.) may provide information indicative of the participant's positive or negative feelings for the associate. In one example, if a participant has a long interaction with an associate assigned to a Kitchen zone, and the customer does not buy any kitchen items from the Kitchen zone, then the touchpoint server 60 may determine that the participant may prefer less interaction, or that the interaction may not be positive. By way of another example, if it is determined that a participant has a pattern of returning items purchased after interacting with a particular associate, the touchpoint server 60 may determine that the participant may have been pressured into making the purchase, or that the participant may not have had a positive interaction or connection with the associate.

In aspects, the touchpoint server 60 generates one or more sentiment scores or values for one or more interaction events between a participant and respective associates of a venue. As used herein, the term sentiment value refers to a numeric value on a spectrum of positive or negative feelings or attitudes towards a situation or event. In embodiments, the sentiment module 74 is utilized to analyze touchpoint data stored in the touchpoint database 70 (e.g., touchpoint data from step 301-303) and assign sentiment values to interactions based on the touchpoint data. Conventional sentiment analysis systems may be utilized to analyze text data in accordance with aspects of the present invention. By way of example, customer service questionnaires may be analyzed for words associated with negative thoughts or emotions, and any interaction events associated with such words can be given a corresponding sentiment value (e.g., based on a sentiment value scale of 1-10). In embodiments, the touchpoint server 60 rates associates (e.g., sales associates) according to one or more customer service parameters (e.g., sentiment values associated with a participant). In aspects, the touchpoint server 60 can assign an associate to assist a returning participant based on the ratings, sentiment values, or other customer service parameters generated by the touchpoint server 60.

Still referring to FIG. 3, at step 310, the alert tool 68 utilizes the customer service parameters determined at step 309 to generate one or more alerts or notifications. In embodiments, an alert or notification is sent to the highest rated associated from step 309, alerting the associated that he or she should provide customer service to the returning participant. In embodiments, if a sentiment value of an interaction with an associate is negative, an alert may be sent to the associate indicating that the associate should refrain from approaching the returning participant, or that another associate is being sent to assist the returning participant. In embodiments, the alert includes touchpoint data related to a previous interaction event. For example, an alert may indicate that previous positive interactions with a returning participant are in the 1-3 minute range, and the returning participant last purchased items x, y and z, etc. Optionally, the alert tool 68 may be configured to enable a user to adjust and set various types of alerts. For example, a user may choose between options of alerting an associate of negative sentiment values of a returning participant, sending an alert to the associate to avoid the returning participant, or sending no alert.

Figure 4:
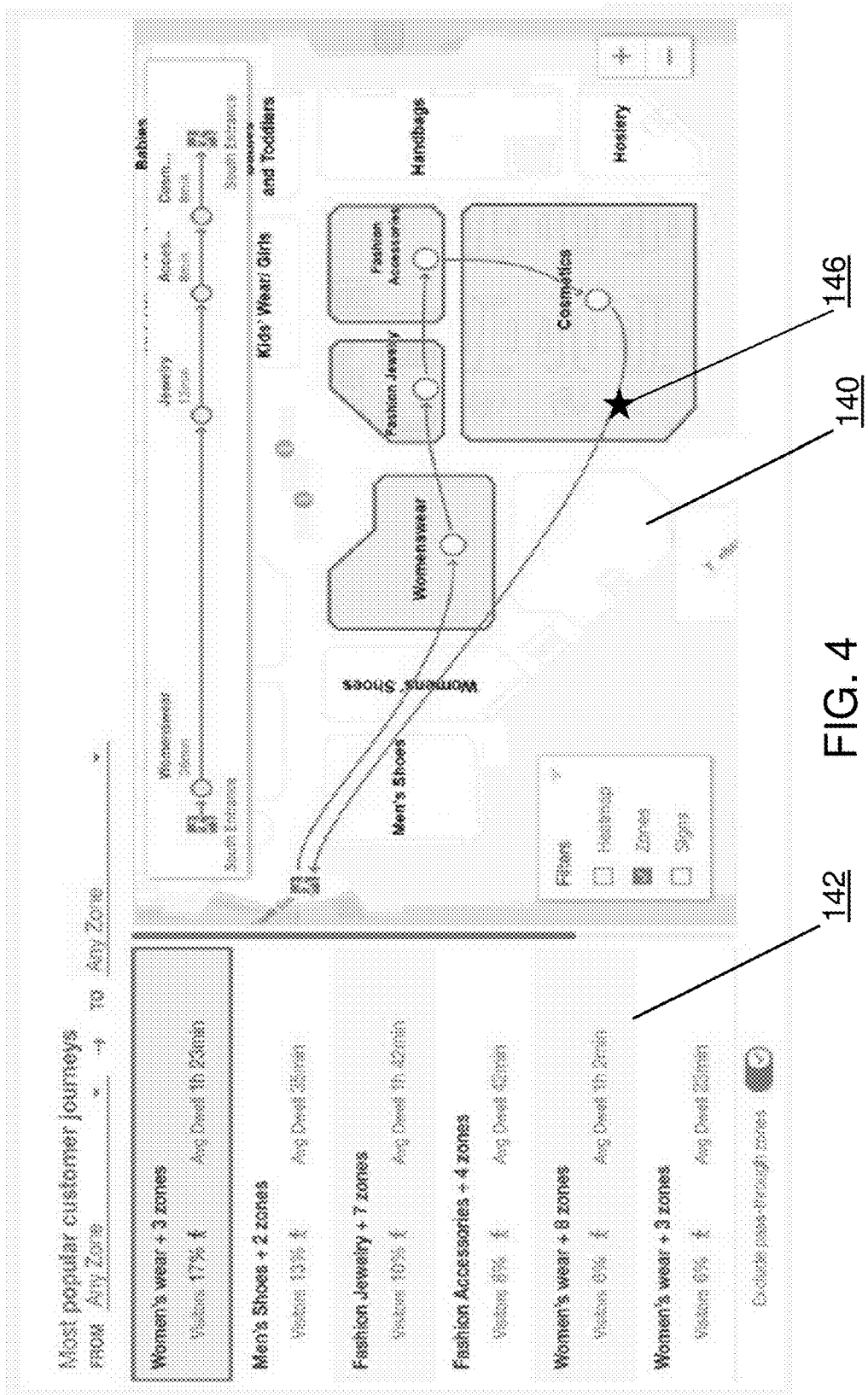
FIG. 4 shows an exemplary report in accordance with aspects of the invention.

FIG. 4 depicts an exemplary report which can be generated by the reporting tool 68 of the touchpoint server 60 and presented to a user of the touchpoint server 60 (e.g., via a monitor) in accordance with embodiments of the invention. In embodiments, event data gathered at steps 301-303 is utilized by the reporting tool 68 to generate and/or store a map 140 showing a journey of the participant and/or the associate before, during and after an interaction event. The map can be generated in real time or can be generated at any time after an event (e.g., first event). In embodiments, the event data is utilized to generate a textual description or journal of the journey of the participant and/or the associate before, during and after an interaction event (e.g., "customer in kitchen zone for 10 minutes with Bob"). One example of a journal is depicted at 142 in FIG. 4. In embodiments, interaction event data can be presented through the display. An example of an interaction event icon is depicted at 146 in FIG. 4.

Figure 5:
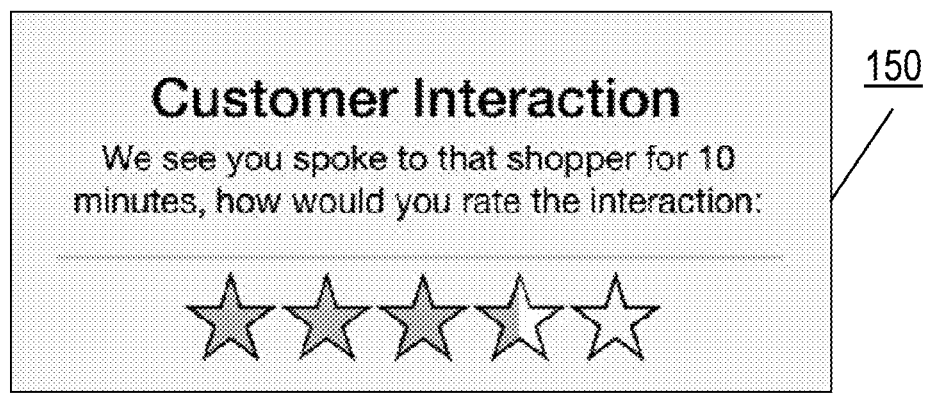
FIG. 5 shows an exemplary interactive feedback screen in accordance with aspects of the invention.

FIG. 5 depicts an example of an interactive feedback screen 150 that the touchpoint server 60 may present to an associate via their mobile device (e.g., 110) after the touchpoint server 60 determines that an interaction event has occurred between the participant and the associate. In aspects, the touchpoint database 100 can record information received from the associate through the feedback screen 150. The exemplary interaction screen depicted at 150 shows a satisfaction rating system by which the associate can indicate a level of satisfaction with an interaction between the associate and a participant. It should be understood that a similar feedback screen could be present to a participant through their mobile device (e.g., 100). By way of example, the touchpoint server 60 may send a message to a participant through communication with the touchpoint module 104 of the first mobile device 100. In embodiments, a satisfaction survey may be sent by the touchpoint server 60 to a participant and/or an associate after the touchpoint server 60 determines that an interaction event has occurred. By way of example, online or telephone surveys can be sent which utilize codes from the bottom of a sales receipt (e.g., sales receipt provided to participant with a purchase) to identify a particular event (e.g., first event). Various conventional methods of obtaining customer satisfaction data and associate satisfaction data could be utilized in accordance with embodiments of the present invention, and the invention is not intended to be limited to the examples described herein.

Figure 6:
FIG. 6 shows an exemplary alert in accordance with aspects of the invention.

FIG. 6 depicts an exemplary notification in accordance with aspects of the present invention. In the example shown in FIG. 6, an associate receives a notification 160 on their mobile device 110, indicating that a returning participant "Ann" has entered the store. In the example of FIG. 6, the notification 160 includes touchpoint data related to a previous interaction. Specifically, the notification 160 indicates that the associate previously assisted the returning participant "Ann" with the purchase of a KitchenAid mixer. In embodiments, the associate will have the options of accepting the notification or declining the notification. In the example of FIG. 6, if an associate selects "OK", the touchpoint server 60 will assume that the associate is able to assist the participant, and if the associate selects "Cancel", the touchpoint server 60 will assume that the associate is not available to assist the participant. In the case where the touchpoint server 60 receives an indication that an associate is not available to assist a participant, the touchpoint server 60 may select another associate based on customer service parameter (e.g., the second highest rated sales associated with respect to the participant).

With reference back to FIG. 3, at step 311, the reporting tool 68 may be utilized to generate a report based on touchpoint data stored in the touchpoint database 70. It should be understood that this step could be performed at any stage in the process of FIG. 3. As an example, a report may be generated by the reporting tool 68 showing the number of interactions an associate in a particular zone has had throughout the course of a day, and the number of purchase made based on the interactions.

Figure 7:
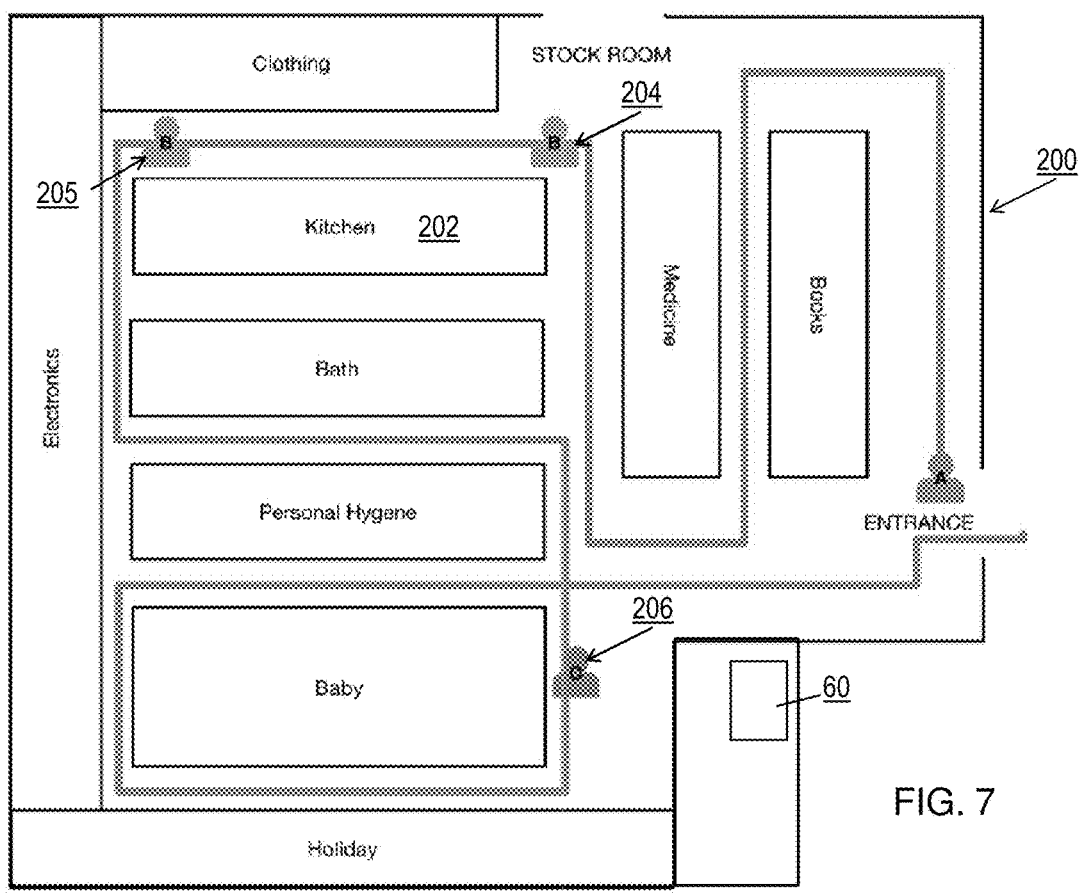
FIG. 7 shows a diagram of an exemplary scenario in accordance with aspects of the invention.

FIG. 7 depicts an exemplary interaction scenario in accordance with aspects of the present invention. In the scenario of FIG. 7, Participant A enters a venue 200 and browses a few aisles before heading to the Kitchen zone 202 of the venue 200. A monitoring module 66 (depicted in FIG. 2) of a touchpoint server 60 of the venue detects the presence of Participant A, and starts recording the journey of Participant A within the venue 200 for a first shopping event in the manner described with respect to the steps 301 and 302 of FIG. 3. Participant A interacts with Sales Associate B on a first occasion indicated at 204 and a second occasion indicated at 205 to ask questions about a wedding registry and which items to purchase from the wedding registry. The monitoring module 66 determines that the first and second interaction events occurred, and records the interaction data in accordance with step 303 of FIG. 3. Participant A then browses a few other zones (e.g., Bath, Baby, etc.) before interacting with Sales Associate C (indicated at 206) to ask more questions before making purchases. Again, the monitoring module 66 detects that the interaction 206 with Sales Associate C has occurred, and records associated interaction data in accordance with step 303 of FIG. 3. Participant A then purchases a large gift from the wedding registry, and several small items from other zones, and purchase data is saved in the touchpoint database 70 (shown in FIG. 2) of the touchpoint server 60 in accordance with step 306 of FIG. 3. Participant A then leaves the venue 200. The monitoring module 66 detects that Participant A has left the venue 200 in accordance with step 305 of FIG. 3, and records the end of the first shopping event.

Still referring to FIG. 7, the touchpoint system 50 is configured to understand Participant A's journey inside the venue 200 and tracks Participant A's interactions with Sales Associates B and C, as well as purchases made. Later, Participant A returns to the venue 200, and Participant A's return is detected by the monitoring module 66 in accordance with step 307 of FIG. 3. In accordance with steps 308 and 309 of FIG. 3, touchpoint data associated with Participant A's first shopping event is retrieved by the touchpoint server 60, and the touchpoint server 60 determines customer service parameters based on the touchpoint data. In the scenario of FIG. 7, the touchpoint server 60 determines that: 1) Participant A purchased a large item from the Kitchen zone after interacting with Sales Associate B; 2) Participant A purchased small items from zones associated with Sales Associate C; and 3) Participant A spent 10 minutes interacting with Sales Associate B and 1 minute interacting with Sales Associate C. Given these customer service parameters, the touchpoint server 60 rates Sales Associate B higher than Sales Associate C for the first shopping event. Additionally, given these customer service parameters, the touchpoint server 60 associates positive sentiment values with Sales Associate B, and slightly lower but also positive values with Sales Associate C. The alert tool 72 understands that Sales Associate B has a higher rating and/or is associated with a higher sentiment value than Sales Associate C. Accordingly, the alert tool 72 pushes a message to the second mobile device 110 of Sales Associate B, alerting Sales Associate B that Participant A has returned. In this scenario, Sales Associate B receives the alert instead of Sales Associate C because Sales Associate B spent more time with Participant A, and because Participant A purchased more merchandise from the Kitchen zone (a zone associated with Sales Associate B).

In embodiments, a service provider, such as a Solution Integrator, could offer to perform the processes described herein. In this case, the service provider can create, maintain, deploy, support, etc., the computer infrastructure that performs the process steps of the invention for one or more customers (e.g., shopping venues). These customers may be, for example, any business that desires to enhance customer service. In return, the service provider can receive payment from the customer(s) under a subscription and/or fee agreement and/or the service provider can receive payment from the sale of advertising content to one or more third parties.

In still another embodiment, the invention provides a computer-implemented method for customer touchpoint pattern and sentiment analysis. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for customer touchpoint pattern and sentiment analysis, comprising:
    detecting, by a computer device, the presence of a remote mobile device of a participant within a venue during a first event;
    recording, by the computing device, location data based on movement of the mobile device of the participant through a plurality of zones of the venue during the first event;
    detecting, by the computing device, at least one interaction event during the first event between the participant and a venue associate, wherein detecting the at least one interaction event comprises detecting that the mobile device of the participant is within a threshold distance of a mobile device of the venue associate;
    recording, by the computing device upon detecting the at least one interaction event, first event data including interaction event data of the at least one interaction event and the location data;
    detecting, by the computing device, the presence of the mobile device of the participant within the venue during a second event subsequent to the first event;
    determining, by the computing device, one or more customer service parameters based on the first event data, including the interaction event data;
    assigning a rating to the venue associate based on the one or more customer service parameters;
    generating, by the computing device, an alert during the second event based on the rating; and
    sending, by the computing device, a notification during the second event based on the alert.

2. The computer-implemented method of claim 1, wherein the one or more customer service parameters include a sentiment value indicative of sentiment of the participant with respect to the venue associate.

3. The computer-implemented method of claim 2, wherein the sentiment value is a positive sentiment value, and wherein the sending the notification comprises sending the notification to the mobile device of the venue associate at the venue recommending the venue associate assist the participant based on the alert.

4. The computer-implemented method of claim 3, wherein:
    the first event data includes purchase data; and
    the notification includes the purchase data and the interaction event data.

5. The computer-implemented method of claim 3, further comprising:
    receiving, by the computing device, an indication that the venue associate is unavailable during the second event; and
    based on receiving the indication that the venue associate is unavailable, sending, by the computing device, a notification during the second event to a remote mobile device of another venue associate at the venue recommending that the other venue associate assist the participant based on the alert.

6. The computer-implemented method of claim 2, wherein the sentiment value is a negative sentiment value, and wherein the sending the notification comprises sending the notification to a remote mobile device of another venue associate at the venue recommending the other venue associate assist the participant based on the alert.

7. The computer-implemented method of claim 1, further comprising:
    receiving, by the computing device, the location data from a Bluetooth beacon monitoring device at the venue; and
    receiving, by the computing device, location data of the mobile device of the venue associate from the Bluetooth beacon monitoring device.

8. The computer-implemented method of claim 1, further comprising:
    detecting, by the computing device, at least one interaction event between the participant and a second venue associate, wherein the first event data includes interaction event data regarding the at least one interaction event between the participant and the venue associate and the at least one interaction event between the participant and a second venue associate;
    determining, by the computing device, a sentiment of the participant with respect to the venue associate during the first event based on the first event data; and
    determining, by the computing device, a sentiment of the participant with respect to the second venue associate during the first event based on the first event data;
    wherein generating the system alert is further based on the determined sentiment of the participant with respect to the venue associate and the determined sentiment of the participant with respect to the second venue associate.

9. The computer-implemented method of claim 8, wherein the sending the notification comprises sending the notification to one of the venue associate and the second venue associate to assist the participant, based on the alert.

10. The computer-implemented method of claim 8, wherein the one or more customer service parameters is selected from the group consisting of: an amount of time of the at least one interaction event; a number of interaction events; participant feedback regarding the first event; venue associate feedback regarding the first event; a monetary amount of a purchase during the first event; a number of items or services purchased during the first event; a monetary amount of a purchase related to a designated zone of the venue associate; one or more purchase returns; sentiment values associated with one or more interactions; and combinations thereof.

11. The method of claim 1, further comprising sending, by the computing device, a second notification during the second event based on the alert, wherein the first notification includes instructions to assist the participant and the second notification includes instructions to refrain from assisting the participant.

12. The method of claim 1, further comprising generating, by the computing device, a map showing a journey of the participant and the venue associated before, during and after the interaction event.

13. A computer program product for customer touchpoint pattern and sentiment analysis, the computer program product comprising a computer readable storage medium having program instructions embodied therewith, the program instructions executable by a computing device to cause the computing device to:
- detect the presence of a remote mobile device of a participant within a venue during a first event;
- monitor the location of the mobile device of the participant within the venue during the first event;
- detect at least one interaction event within a physical space of the venue during the first event between the participant and a venue associate, wherein detecting the at least one interaction event comprises detecting that the mobile device of the participant is within a threshold distance of a mobile device of the venue associate for a predetermined amount of time during the first event;
- record first event data, including interaction event data of the at least one interaction event, in a touchpoint database;
- detect the presence of the mobile device of the participant within the venue during a second event;
- access, based on detecting the presence of the mobile device of the participant during the second event, the first event data in the touchpoint database;
- determine sentiment data indicative of sentiment of the participant with respect to the venue associate based on the accessed first event data;
- generate an alert based on the sentiment data; and
- send a notification based on the alert.

14. The computer program product of claim 13, wherein the notification is sent to the mobile device of the venue associate, the sentiment data is a positive sentiment value, and the notification is a notification recommending the venue associate assist the participant based on the alert, wherein the notification includes purchase data and interaction event data.

15. The computer program product of claim 14, the program instructions further cause the computing device to:
- receive an indication that the venue associate is unavailable from the mobile device of the venue associate; and
- based on receiving the indication that the venue associate is unavailable, send a notification to a mobile device of another venue associate at the venue recommending that the other venue associate assist the participant based on the alert.

16. The computer program product of claim 13, wherein the program instructions further cause the computing device to:
- detect at least one interaction event between the participant and a second venue associate during the first event, wherein the first event data includes interaction event data regarding the at least one interaction event between the participant and the venue associate and the at least one interaction event between the participant and a second venue associate; and
- determine sentiment data of the participant with respect to the second venue associate during the first event based on the data stored in the touchpoint database;
- wherein the sending the notification comprises sending the notification to one of the venue associate and the second venue associate to assist the participant, based on the alert, and wherein generating the system alert is based on the determined sentiment of the participant with respect to the venue associate and the determined sentiment of the participant with respect to the second venue associate.

17. A system for customer touchpoint pattern and sentiment analysis, comprising:
- a CPU, a computer readable memory and a computer readable storage medium associated with a computing device;
- program instructions to receive location data of a remote mobile device of a participant from a Bluetooth beacon monitoring device within the venue;
- program instructions to detect the presence of the mobile device of the participant within the venue during a first event based on the location data;
- program instructions to track the location of the mobile device of the participant within the venue during the first event based on the location data;
- program instructions to detect at least one interaction event within the venue between the participant and an on-site venue associate, wherein detecting the at least one interaction event comprises detecting that the mobile device of the participant is within a threshold distance of a mobile device of the venue associate for a predetermined amount of time during the first event;
- program instructions to record first event data including interaction event data of the at least one interaction event;
- program instructions to end the recording of the first event data upon detecting that the mobile device is no longer within the predetermined zone;
- program instructions to detect the presence of the mobile device of the participant within the predetermined zone of the venue during a second event after the first event;
- program instructions to access, based on detecting the presence of the mobile device of the participant during the second event, the first event data;
- program instructions to determine one or more customer service parameters based on the accessed first event data, the customer parameters including a sentiment value indicative of the sentiment of the participant with respect to the venue associate;
- program instructions to assign a rating to the venue associate based on the one or more customer service parameters;
- program instructions to generate an alert during the second event based on the one or more customer service parameters and the rating;
- program instructions to assign a particular venue associate to assist the participant during the second event; and
- program instructions to send a notification to the particular venue associate assigned to assist the participant during the second event, wherein the notification includes details regarding the first event,
- wherein the program instructions are stored on the computer readable storage medium for execution by the CPU via the computer readable memory.

18. The system of claim 17, further comprising wherein sending the notification comprises sending the notification to the mobile device of the venue associate recommending the venue associate assist the participant based on the alert, wherein the notification includes purchase data and interaction event data and the sentiment value is a positive sentiment value.

19. The system of claim 17, further comprising:
- program instructions to detect at least one interaction event between the participant and a second venue associate during the first event, wherein the first event data includes interaction event data regarding the at least one interaction event between the participant and the venue associate and the at least one interaction event between the participant and the second venue associate; and program instructions to determine a sentiment value indicative of sentiment of the participant with respect to the second venue associate during the first event based on the accessed first event data;

program instructions to assign a rating to the second venue associate based on the one or more customer service parameters;

wherein the sending the notification comprises sending the notification to one of the venue associate and the second venue associate to assist the participant, based on the alert, and wherein generating the system alert is based on the determined sentiment of the participant with respect to the venue associate the determined sentiment of the participant with respect to the second venue associate, the rating of the venue associate, and the rating of the second venue associate.

20. The system of claim 17, wherein the one or more customer service parameters is further selected from the group consisting of: an amount of time of the at least one interaction event; a number of interaction events; participant feedback regarding the first event; venue associate feedback regarding the first event; a monetary amount of a purchase during the first event; a number of items or services purchased during the first event; a monetary amount of a purchase related to a designated zone of the venue associate; one or more purchase returns; and combinations thereof.

* * * * *